UNITED STATES PATENT OFFICE.

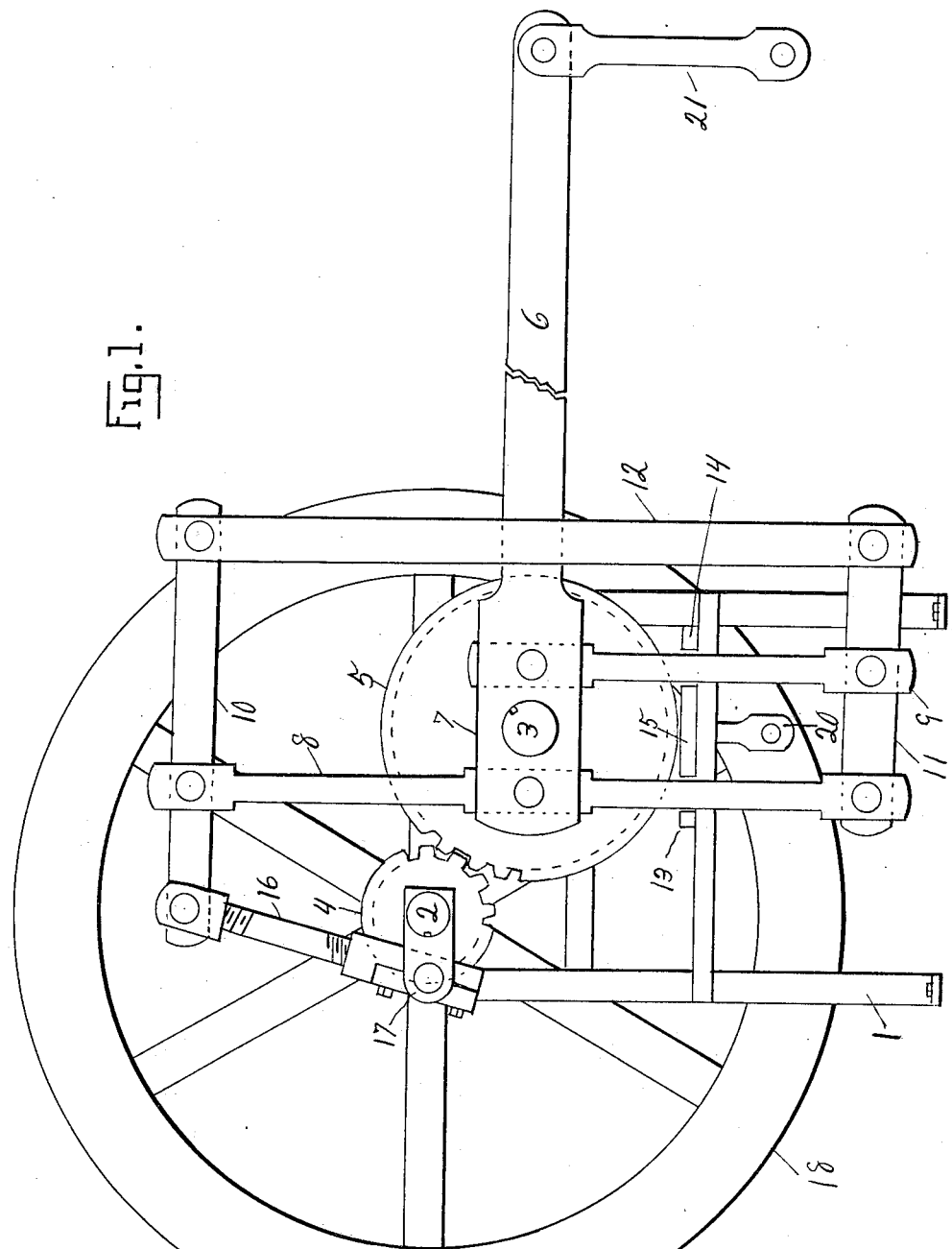

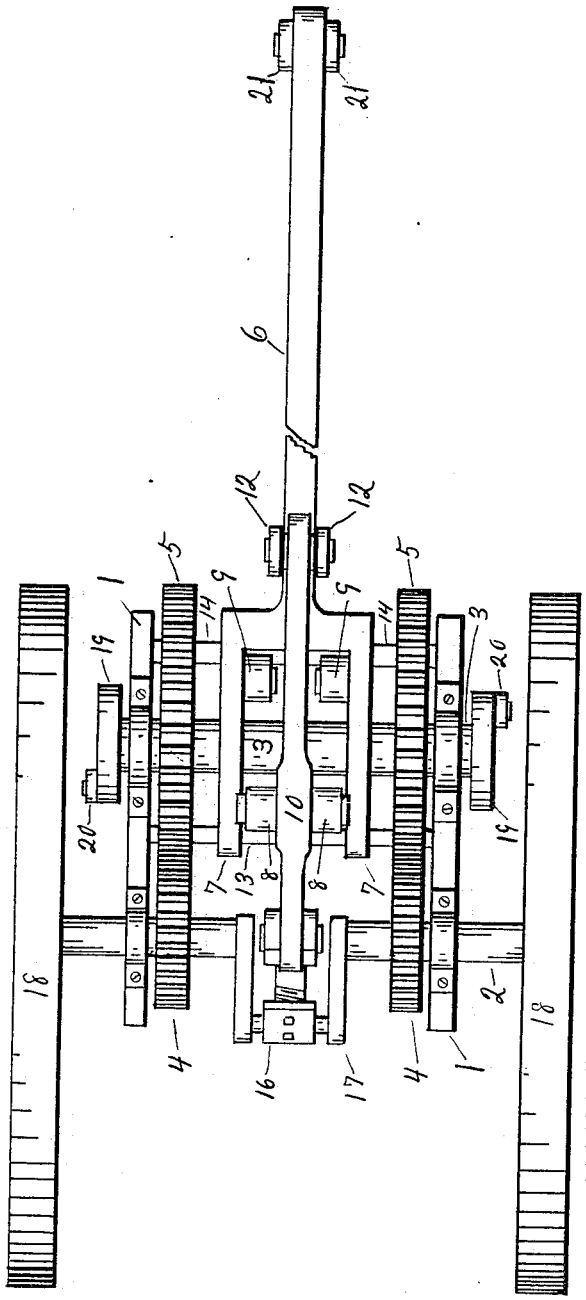

JAMES R. FRENCH, OF LOMAX, ILLINOIS.

TRANSMISSION DEVICE.

1,091,454.  Specification of Letters Patent.  Patented Mar. 24, 1914.

Application filed December 23, 1912. Serial No. 738,120.

*To all whom it may concern:*

Be it known that I, JAMES R. FRENCH, a citizen of the United States, residing at the town of Lomax, in the county of Henderson and State of Illinois, have invented certain new and useful Improvements in Transmission Devices, of which the following is a specification.

This invention relates to improvements in transmission devices, and has for an object to provide a device for transmitting motion, or power, from a prime mover to the object to be acted on, that will be efficient in operation, positive in action and that will be economical in construction.

With the foregoing, and other objects in view, the invention consists of the novel construction, and arrangement of parts to be hereinafter referred to and illustrated in the accompanying drawings, which form a part of this specification, in which is shown an embodiment of the invention, but it is to be understood that changes, variations and modifications may be resorted to which come within the scope of the claims appended hereunto.

In the drawings, in which similar reference characters indicate like parts in the different views;—Figure 1, is a side, elevation, the frame, fly-wheel and gears on that side being removed; Fig. 2, is plan view.

Referring to the drawings, —1— indicates a frame, that may be of any suitable construction, on which a driving shaft —2— and a driven shaft —3— are mounted in parallel relationship and operatively connected by means of pinions —4—, on the driving shaft 2, and gears —5— on the driven shaft 3. A lever —6— is fulcrumed on the driven shaft 3. The forward end of the lever 6 is bifurcated, in order to provide a broader bearing on the shaft 3, and that the arms —7—7— thereof may serve as points of attachment for the vertical members —8— and —9—. The members 8—8 being pivotally connected to the arms 7—7 forward of the shaft 3, the center of the connection being a stated distance from the center of the shaft 3; the members 9—9 being pivoted to the arms 7—7 to the rear of the shaft 3 and the same stated distance therefrom as the members 8—8. An upper member —10— and a lower member —11— are arranged in parallel spaced relationship to the lever 6, the vertical members 8—8 being pivotally connected to each of them, the depending members 9—9 being connected to the lower member 11. Arms —12—12— connect the rear ends of the members 10 and 11, and serve in connection with the members 8—8 to hold the members 10—11 in their spaced relationship to the lever 6. A bar —13— disposed across the frame immediately in front of the vertical members 8—8, in connection with a similar bar —14— in the rear of the members 9—9, and a plate —15— between said members serves to guide said members and maintain them in vertical alinement. To the forward end of the upper member 10 a connecting rod —16— is connected, that is also connected to a crank —17— centrally located on the shaft 2. On each end of the shaft 2 are secured fly-wheels —18—18—. On each end of the shaft 3 are secured crank-disks —19—19—, connected with which are connecting rods 20 that serve to connect the device to the apparatus that is to be operated.

The device may be used to transmit manual power, the lever 6 being raised and lowered manually, or the lever may be connected to a prime mover of any desired character, such as a steam engine, an explosive motor or an electric motor, by suitable means such as a connecting rod —21—.

The operation of the device is as follows: raising the rear end of the lever 6 depresses the forward end, by reason of its connection thereto, and by means of the vertical member 8, the forward end of the lever 6 carries with it, in its travel, the upper and lower bars 10 and 11; the depending rod 9 being connected to the lever 6 in the rear of the fulcrum point moves up as the rod 8 moves down, and being connected to the lower bar 11, the bar 11 moves with it, this results in the bar 11 pivoting on a center in vertical alinement with the center of the shaft 3, the fulcrum point of the lever 6. The arms 12—12 being connected to the rear ends of the bars 11 and 10 these bars move in unison with each other and with the lever 6. As the forward end of the bar 10 is raised and lowered, by the movement of the lever 6, it transmits its motion, by means of the crank 17, to the driving shaft 2, the fly wheels serving to carry it over the dead center. The depression of the rear end of the lever 6, now, will cause movements the reverse of those just described.

Having described my invention so that any one may make and use the same I claim:—

1. A driving and a driven shaft, a crank and a pinion on the driving shaft, a gear on the driven shaft adapted to be engaged by said pinion, an operative lever fulcrumed on the driven shaft, upper and lower bars disposed in parallel relationship to said lever, vertical members in pivotal connection with said lever and bars forward of the driven shaft, vertical members in pivotal connection with said lever and the lower bars in the rear of the driven shaft, guides adapted to maintain said members in vertical alinement, members in pivotal connection with the rear ends of said bars and a pitman connecting the forward end of the upper bar with the crank on the driving shaft.

2. A frame, driving and driven shafts mounted therein, an operating lever, said lever being bifurcated at its forward end and fulcrumed, midway of the branches of said bifurcation on the driven shaft, upper and lower bars disposed in parallel relationship to said lever, vertical members in pivotal connection with said bars and branches forward of the driven shaft, vertical members in pivotal connection with the lower bar and said branches in the rear of the driven shaft, guide members positioned on the frame and adapted to maintain said members in vertical alinement, members in pivotal connection with the rear ends of said upper and lower bars, a crank centrally positioned on the driving shaft, a pitman connecting the forward end of the upper bar with said crank, a pair of pinions on said driving shaft, and a pair of gears on the driven shaft adapted to be engaged by said pinions.

JAMES R. FRENCH.

Witnesses:
J. H. BRADY,
W. B. MUNNELL.

---

Copies of this patent may be obtained for five cents each, by addressing the "Commissioner of Patents, Washington, D. C."